(12) United States Patent
Jain et al.

(10) Patent No.: US 11,048,492 B2
(45) Date of Patent: Jun. 29, 2021

(54) REDUCING DOWNTIME WHILE PATCHING BINARIES ON A CLUSTER

(75) Inventors: Nitin Jain, Mountain View, CA (US); Tim Misner, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1661 days.

(21) Appl. No.: 12/861,928

(22) Filed: Aug. 24, 2010

(65) Prior Publication Data

US 2012/0054732 A1    Mar. 1, 2012

(51) Int. Cl.
  *G06F 8/65*   (2018.01)
  *G06F 8/71*   (2018.01)
  *G06Q 10/06*  (2012.01)
  *G06F 8/41*   (2018.01)

(52) U.S. Cl.
  CPC .............. *G06F 8/65* (2013.01); *G06F 8/433* (2013.01); *G06F 8/71* (2013.01); *G06Q 10/0631* (2013.01)

(58) Field of Classification Search
  CPC .......... G06F 9/00–548; G06F 8/00–78; G06Q 20/00–425; G06Q 10/00–30
  See application file for complete search history.

(56) References Cited

U.S. PATENT DOCUMENTS

| | | | |
|---|---|---|---|
| 7,764,629 B2 * | 7/2010 | Kahan | 370/255 |
| 7,937,455 B2 | 5/2011 | Saha et al. | |
| 8,020,034 B1 * | 9/2011 | Shrivastava et al. | 714/4.11 |
| 8,140,612 B2 | 3/2012 | Tannenbaum et al. | |
| 8,738,961 B2 | 5/2014 | Jain et al. | |
| 8,949,425 B2 | 2/2015 | Gusev et al. | |
| 9,195,528 B1 | 11/2015 | Sarda | |
| 2005/0071470 A1 * | 3/2005 | O'Brien et al. | 709/226 |
| 2009/0144720 A1 * | 6/2009 | Roush et al. | 717/171 |

OTHER PUBLICATIONS

Ron White, How Computers Work, Oct. 15, 2003, Que Publishing, 7th Ed, p. 4. (Year: 2003).*

* cited by examiner

*Primary Examiner* — Mohammad A. Nilforoush
(74) *Attorney, Agent, or Firm* — Tarolli, Sundheim, Covell & Tummino LLP

(57) ABSTRACT

Embodiments of the invention provide systems and methods for applying a patch or a change to a set of binary modules executing on and used by resources of a computing cluster while reducing the downtime of those resources. According to one embodiment, applying a patch to a plurality of binary modules on a computing cluster can comprise identifying resources on one or more of a plurality of nodes of the cluster. Additionally, each of the plurality of binary modules on one or more of the nodes of the cluster can be identified. A graph can be generated logically representing the cluster. Groups within the binary modules and resources can be identified based on the graph. Patches can be applied to the binary modules based on the identified groups. Patching binary modules based on the identified groups can comprise patching all of the binary modules of an identified group together.

14 Claims, 6 Drawing Sheets

REDUCING DOWNTIME WHILE PATCHING BINARIES ON A CLUSTER

BACKGROUND OF THE INVENTION

Embodiments of the present invention relate generally to methods and systems for managing resources on a computing cluster and more particularly to applying a patch or a change to a set of binary modules executing on and used by resources of a computing cluster while reducing the downtime of those resources.

In a cluster computing environment, resources of the cluster can utilize common binary modules executing one nodes of the cluster. For example, in an Oracle Real Application Clusters (RAC) environment, multiple nodes or hosts within a cluster run Oracle database instances simultaneously while accessing a single database. The instance on each node runs within a RAC Oracle home, and it is possible for multiple instances belonging to different RAC databases to run from the same Oracle home. It is also possible for each node to have multiple RAC oracle homes installed on it, where each oracle home may run one or more instances belonging to one or more different RAC databases.

While patching the binary modules on a cluster, the resources are shut down (for the offline patching use-case, with non-rolling patches), and the applications served by these resources are disconnected. This leads to an outage of the applications running from or utilizing those resources. To reduce downtime, there should be only a single attempt to patch binary module on a node. However, automated patching products perform multiple attempts to patch the same binary module due to multiple resources having instances sharing that binary module. Hence, there is a need for improved methods and systems for applying a patch or a change to a set of binary modules executing on and used by resources of a computing cluster while reducing the downtime of those resources.

BRIEF SUMMARY OF THE INVENTION

Embodiments of the invention provide systems and methods for applying a patch, i.e., an update or change, to a set of binary modules executing on and used by resources of a computing cluster while reducing the downtime of those resources. According to one embodiment, a method for applying a patch to a plurality of binary modules on a computing cluster can comprise identifying resources on one or more of a plurality of nodes of the cluster. For example, the resources can comprise one or more instances of a database, one or more applications, one or more servers, and/or any other resources on the cluster. Additionally, each of the plurality of binary modules on one or more of the plurality of the nodes of the cluster can be identified. A graph can be generated logically representing the cluster. For example, the graph logically representing the cluster can represent each of the plurality of nodes, each of the resources, and each of the plurality of binary modules and relationships between the binary modules and the resources. Groups within the binary modules and resources can be identified based on the graph. Patches can be applied to the binary modules based on the identified groups. Patching binary modules based on the identified groups can comprise patching all of the binary modules of an identified group together.

Generating the graph logically representing the cluster can comprise representing the cluster as a root of the graph. Each node of the cluster can be represented as a first set of nodes of the graph. For example, the first set of nodes of the graph can be child nodes of the root. Each binary module can be represented as a second set of nodes of the graph. For example, the second set of nodes of the graph can be child nodes of the first set of nodes of the graph based on the nodes of the cluster on which the binary is executing. Each resource can be represented as a third set of nodes of the graph. For example, the third set of nodes of the graph can be child nodes of the second set of nodes of the graph based on the binaries which the resources are executing.

Identifying groups within the binaries and resources based on the graph can comprise selecting a vertex from the second set of nodes of the graph or third set of nodes of the graph. The selected vertex can be marked as a member of the group. An edge to an unmarked vertex in the second set of nodes of the graph or third set of nodes of the graph can be identified and the unmarked vertex can be selected. Marking the selected vertex as a member of the group, identifying an edge to an unmarked vertex of the second set of nodes of the graph or third set of nodes of the graph, and selecting the unmarked vertex can be repeated until no edge to an unmarked vertex is found.

According to another embodiment, a system can comprise a processor and a memory communicatively coupled with and readable by the processor. The memory can have stored therein a series of instructions which, when executed by the processor, cause the processor to apply a patch to a plurality of binary modules in a computing cluster by identifying resources on one or more of a plurality of nodes of the cluster. For example, the resources can comprise one or more instances of a database, one or more applications, one or more servers, and/or any other resources on the cluster. Additionally, each of the plurality of binary modules on one or more of the plurality of the nodes of the cluster can be identified. A graph can be generated logically representing the cluster. For example, the graph logically representing the cluster can represent each of the plurality of nodes, each of the resources, and each of the plurality of binary modules and relationships between the binary modules and the resources. Groups within the binary modules and resources can be identified based on the graph. Patches can be applied to the binary modules based on the identified groups. Patching binary modules based on the identified groups can comprise patching all of the binary modules of an identified group together.

According to yet another embodiment, a machine-readable medium can have stored therein a set of instructions which, when executed by a processor, cause the processor to patch a plurality of binary modules on a computing cluster by identifying resources on one or more of a plurality of nodes of the cluster. For example, the resources can comprise one or more instances of a database, one or more applications, one or more servers, and/or any other resources on the cluster. Additionally, each of the plurality of binary modules on one or more of the plurality of the nodes of the cluster can be identified. A graph can be generated logically representing the cluster. For example, the graph logically representing the cluster can represent each of the plurality of nodes, each of the resources, and each of the plurality of binary modules and relationships between the binary modules and the resources. Groups within the binary modules and resources can be identified based on the graph. Patches can be applied to the binary modules based on the identified groups. Patching binary modules based on the identified groups can comprise patching all of the binary modules of an identified group together.

DETAILED DESCRIPTION OF THE INVENTION

Figure 1:
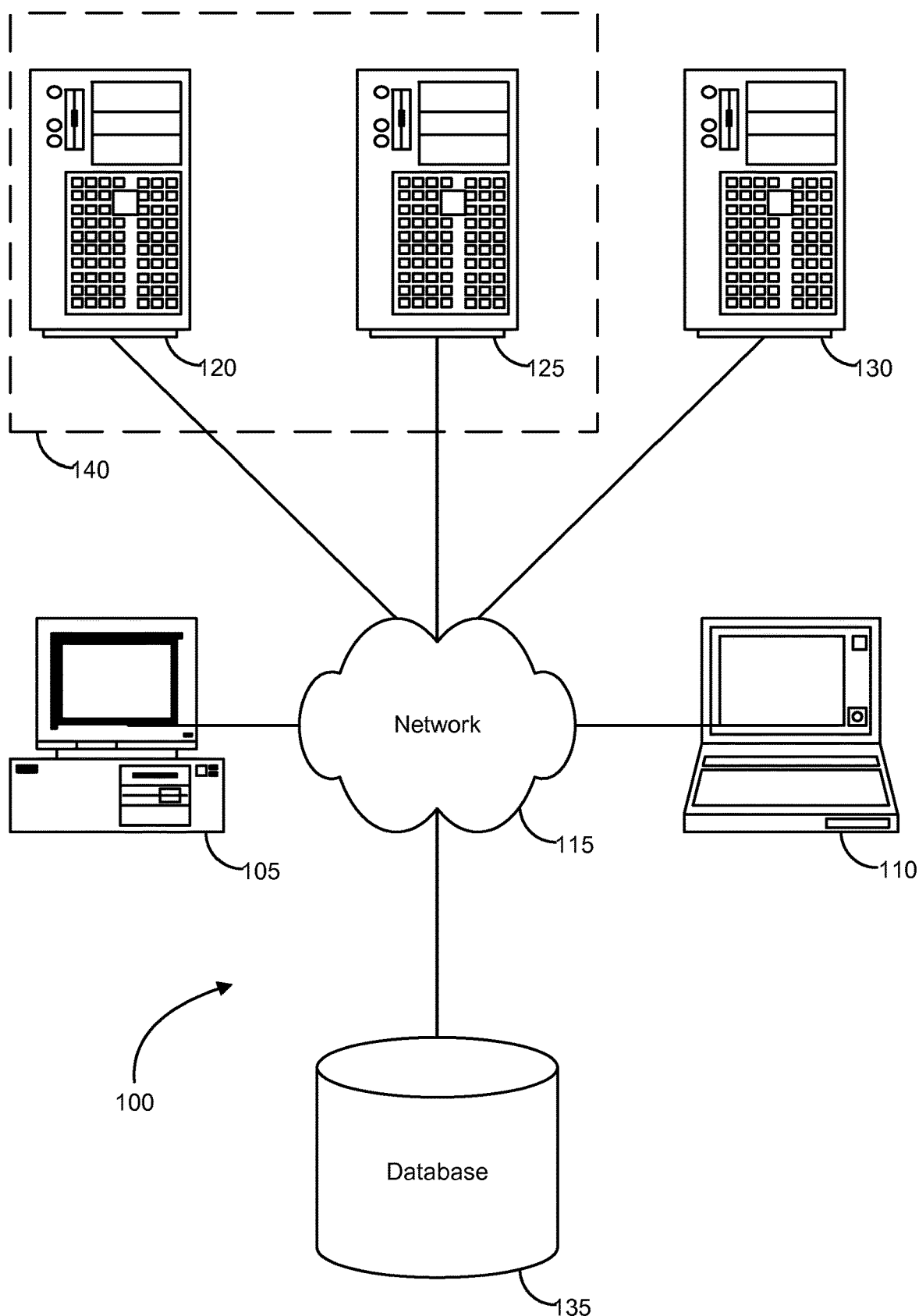
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for applying a patch, i.e., an update or change, to a set of binary modules executing on and used by resources of a computing cluster while reducing the downtime of those resources. More specifically, embodiments of the present invention include identifying groups of resources given a cluster configuration based on a graph logically representing the resources and binary modules on the cluster. Sets of binary module that have common resources can be found based on this graph. Generally speaking, connected components of an undirected graph are pieces of the graph such that all nodes within a piece are connected, and there are no connections across pieces. More formally, a connected component of an undirected graph is a sub-graph in which paths connect any two vertices to each other, and to which no more vertices or edges can be added while preserving its connectivity. That is, it is a maximal connected sub-graph. Connected components of an undirected graph can be easily found using commonly known graph theory algorithms.

Stated another way, embodiments of the present invention provide for identifying resources on one or more of a plurality of nodes of the cluster. For example, the resources can comprise one or more instances of a database, one or more applications, one or more servers, and/or any other resources on the cluster. Additionally, each of the plurality of binary modules on one or more of the plurality of the nodes of the cluster can be identified. A graph can be generated logically representing the cluster. For example, the graph logically representing the cluster can represent each of the plurality of nodes, each of the resources, and each of the plurality of binary modules and relationships between the binary modules and the resources. Groups within the binary modules and resources can be identified based on the graph. Patches can be applied to the binary modules based on the identified groups. Patching binary modules based on the identified groups can comprise patching all of the binary modules of an identified group together. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3 G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
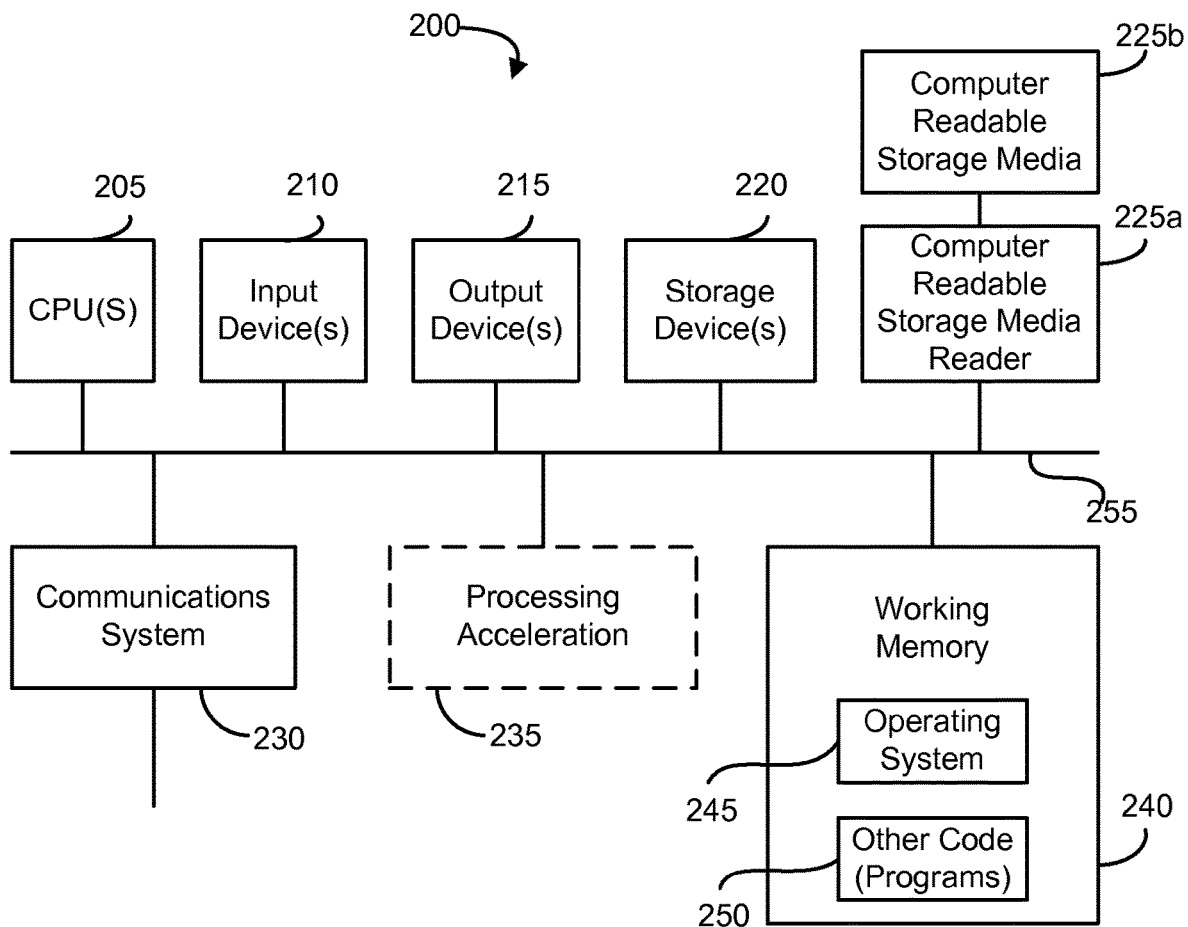
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
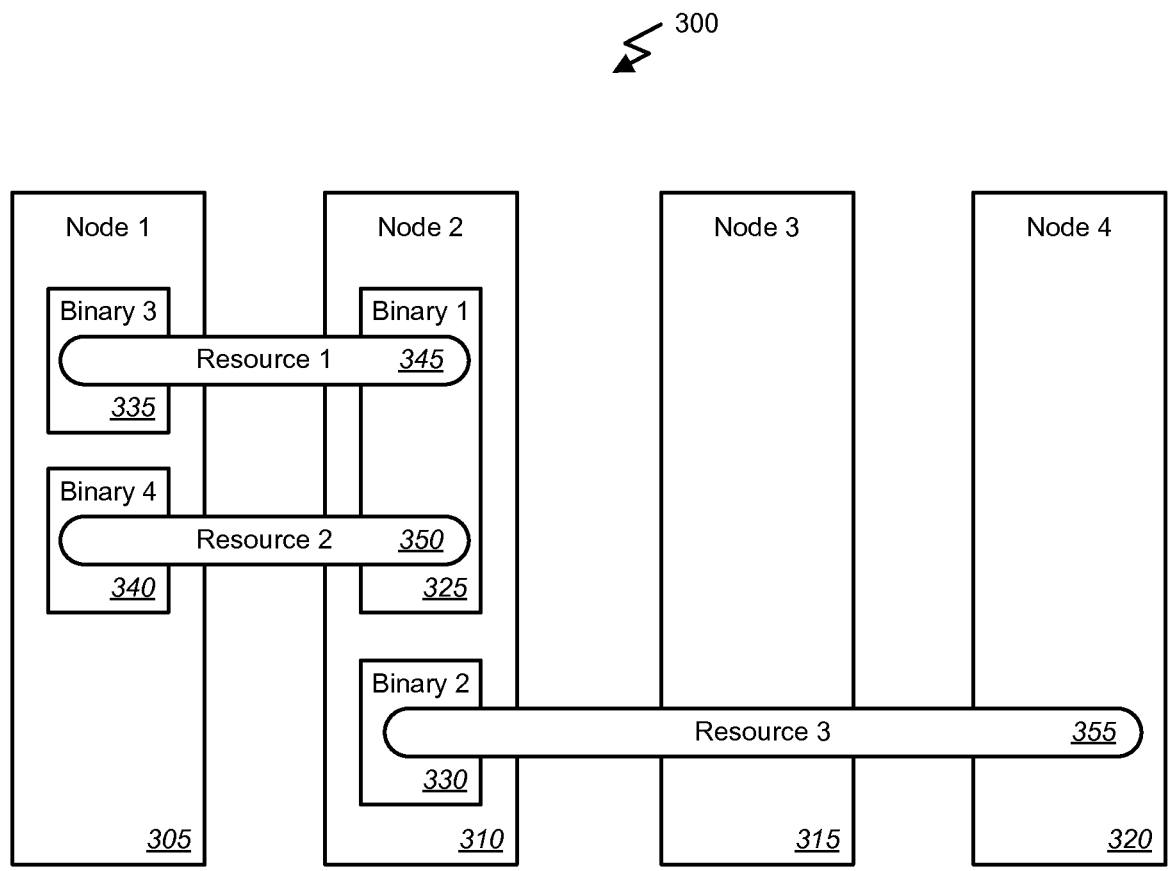
FIG. 3 is a block diagram illustrating a physical arrangement of a system in which embodiments of the present invention may be implemented.

FIG. 3 is a block diagram illustrating a physical arrangement of a system in which embodiments of the present invention may be implemented. In this example, the system 300 includes a cluster comprising a number of computing nodes 305-320. For example, the nodes 305-320 can comprise any server or other computing device operating in a cluster environment such as Oracle Coherence or Oracle Real Application Clusters (RAC) environment.

One or more individual nodes 305 and 310 of the cluster can each execute one or more binary modules 325-340. For example, node 1 305 may execute binary modules 3 335 and 4 340 while node 2 310 executes binary modules 1 325 and 2 330. The binary modules 325-340 can comprise, for example, executable files of one or more applications. In a more specific example, in an Oracle RAC environment the binary modules can comprise Oracle homes.

The system can also include a number of resources 345-355. For example, the resources 345-355 can comprise one or more instances of a database, one or more applications, one or more servers, and/or any other resources on the cluster. The resources 345-355 can utilize one or more of the binary modules 325-340 and can execute on or with one or more nodes 305-320. For example, resource 1 345 can use binary 1 325 and 3 335 and execute on nodes 1 305 and 2 310. Similarly resource 2 350 can utilize binaries 1 325 and 4 340 and execute on nodes 1 305 and 2 310 while resource 3 355 utilizes binary 2 330 and executes across nodes 2 310, 3 315, and 4 320. In a more specific example, in an Oracle RAC environment multiple nodes or hosts within a cluster run Oracle database instances simultaneously while accessing a single database. The instance on each node runs within a RAC Oracle home, and it is possible for multiple instances belonging to different RAC databases to run from the same Oracle home. It is also possible for each node to have multiple RAC oracle homes installed on it, where each oracle home may run one or more instances belonging to one or more different RAC databases.

According to one embodiment, applying a patch to a plurality of binary modules, such as binary modules 325, 335, and 340, on a computing cluster can comprise identifying resources, such as resource 345 and 350 on one or more of a plurality of nodes 305 and 310 of the cluster. A graph can be generated logically representing the cluster. For example, the graph can represent each of the plurality of nodes 305-320, each of the resources 345-355, and each of the plurality of binary modules 325-340 and relationships between the binary modules 325-340 and the resources 345-355. Details of such a graph are described below with reference to FIG. 4.

Groups within the binary modules 325-340 and resources 345-350 can be identified based on the graph. For example, a group of resources including resources 345 and 350 can be identified based on the common binary module 325. This group can include binary modules 325, 335, and 340. Patches can be applied to the binary modules 325-340 based on the identified groups. Patching binary modules based on the identified groups can comprise patching all of the binary modules of an identified group, for example, binary modules 325, 335, and 340, together. An exemplary process for applying a patch to binary modules on a computing cluster is described below with reference to FIG. 5

Figure 4:
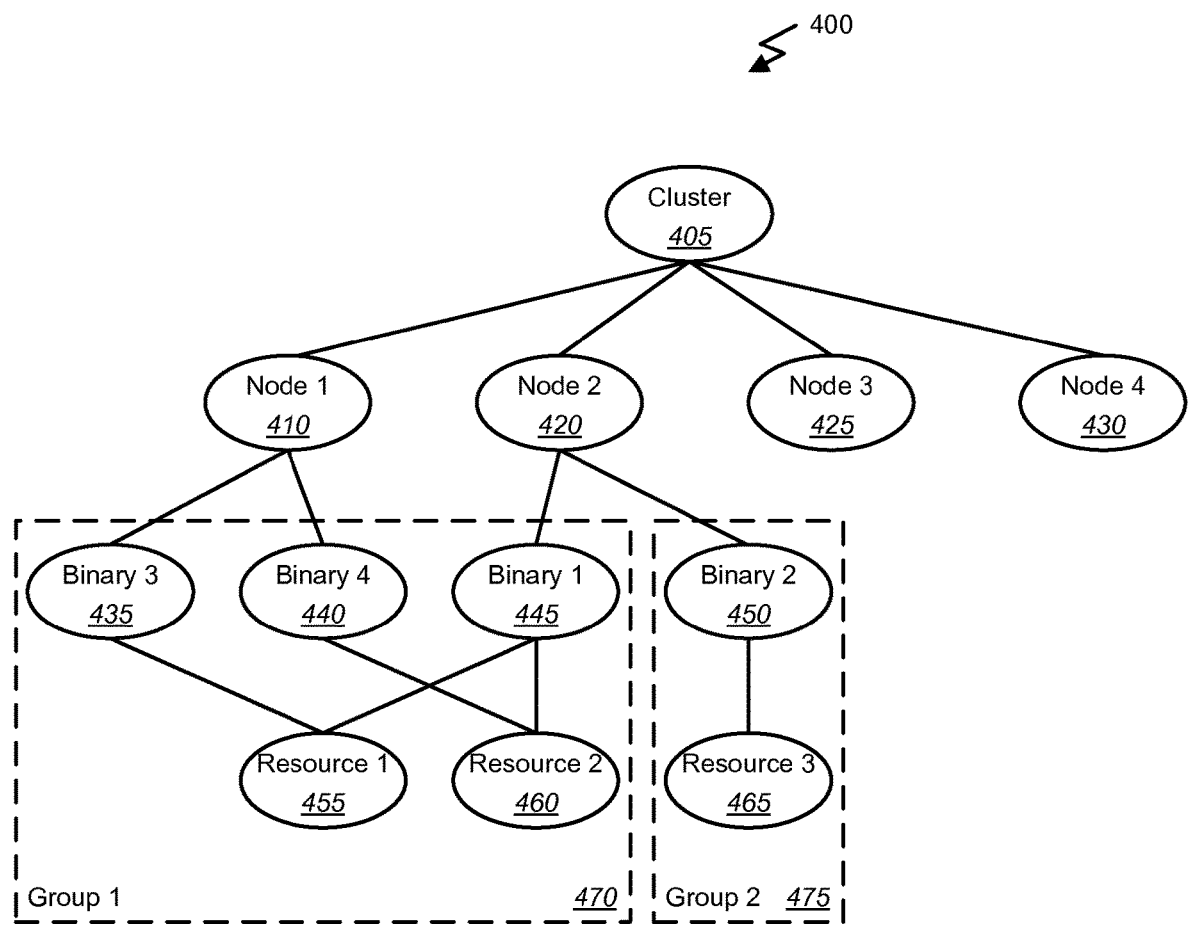
FIG. 4 is a block diagram illustrating an exemplary chart logically representing the physical arrangement of the system of FIG. 3 according to one embodiment of the present invention.

FIG. 4 is a block diagram illustrating an exemplary chart logically representing the physical arrangement of the system of FIG. 3 according to one embodiment of the present invention. As noted above, embodiments of the present invention include identifying groups of resources given a cluster configuration based on a graph logically representing the resources and binary modules on the cluster. As illustrated in this example, the graph 400 can be arranged hierarchically representing the cluster, the nodes of the cluster, the binary modules, and the resources and the relationships between each.

More specifically, the graph 400 can include a root node 405 representing the cluster. Children nodes 410-430 of the root 405 can represent the processing nodes of the cluster. A next level of the hierarchy, i.e., nodes 435-450 can represent the binary modules and can be children nodes of nodes 410-430 based on the processing nodes upon which a binary module executes. So for example, binary modules 325 and 330 described above with reference to FIG. 3 execute on node 2 310. Thus, they are represented here as child nodes 445 and 450 of the representation of node 2 420. A next level of the hierarchy, i.e., nodes 455-465, can represent the resources and can be child nodes of nodes 435-450 based on the binary modules used by those resources. So for example, resource 2 350 described above with reference to FIG. 3 utilizes binary 1 325 and binary 4 340. Thus, the node representing resources 2 460 in the graph 400 can be a child node of the nodes 440 and 445 representing these binary modules.

Stated another way, generating the graph 400 logically representing the cluster can comprise representing the cluster as a root 405 of the graph 400. Each node of the cluster can be represented as a first set of nodes 410-430 of the graph 400. For example, the first set of nodes 410-430 of the graph can be child nodes of the root 405. Each binary module can be represented as a second set of nodes 435-450 of the graph 400. For example, the second set of nodes 435-450 of the graph can be child nodes of the first set of nodes 410-430 of the graph 400 based on the nodes of the cluster on which the binary is executing. Each resource can be represented as a third set of nodes 455-465 of the graph. For example, the third set of nodes 455-465 of the graph can be child nodes of the second set of nodes 435-450 of the graph based on the binaries which the resources are executing.

Sets of binary module that have common resources can be found based on this graph. For example, nodes 455 and 460 of the graph 400 representing resource 1 345 and resource 2 350 are commonly connected to nodes 435, 440, and 445 representing binary module 3 335, binary module 4 340, and binary module 1 325 respectively. Thus, these nodes 435, 440, 445, 455, and 460 can be treated as one group 470. However, the node 465 representing resource 3 355 is not commonly connected and rather connected only to the node 450 representing binary module 2 330. Thus, these nodes 450 and 465 of the graph 400 are treated as a separate group 475.

Generally speaking, connected components of an undirected graph are pieces of the graph such that all nodes within a piece are connected, and there are no connections across pieces. More formally, a connected component of an undirected graph is a sub-graph in which paths connect any two vertices to each other, and to which no more vertices or edges can be added while preserving its connectivity. That is, it is a maximal connected sub-graph. Connected components of such an undirected graph can be found, for example, based on an algorithm such as described below with reference to FIG. 6.

Identifying groups 470 and 475 within the binaries and resources based on the graph 400 can comprise first removing edges between the first set of node 410-430 of the graph 400 and the second set of nodes 435-450 of the graph 400. Then, considering the lower two levels of the graph, i.e., the second set of nodes 435-450 of the graph 400 and third set of nodes 455-465 of the graph 400, identifying groups can comprise selecting a vertex from the second set of nodes 435-450 of the graph 400 or third set of nodes 455-465 of the graph 400. The selected vertex can be marked as a member of the group. An edge to an unmarked vertex in the second set of nodes of the graph or third set of nodes of the graph can be identified and the unmarked vertex can be selected. Marking the selected vertex as a member of the group, identifying an edge to an unmarked vertex of the second set of nodes of the graph or third set of nodes of the graph, and selecting the unmarked vertex can be repeated until no edge to an unmarked vertex is found.

Figure 5:
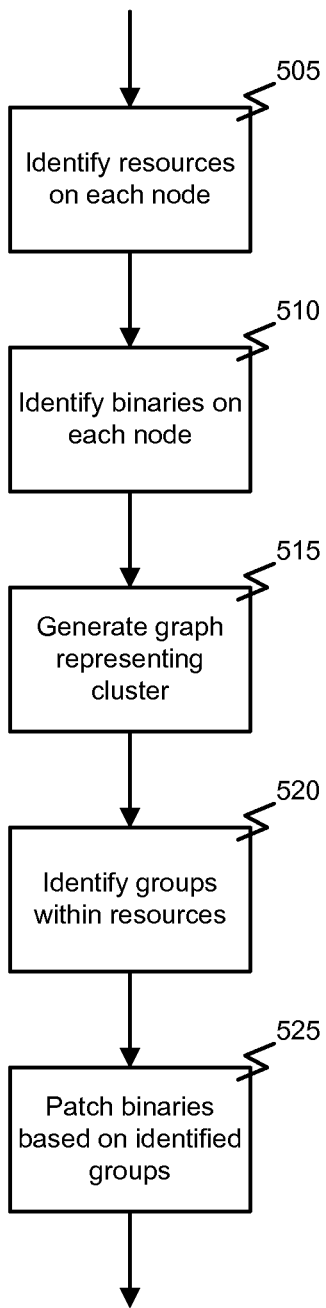
FIG. 5 is a flowchart illustrating an exemplary process for reducing downtime when patching multiple binaries on a cluster according to one embodiment of the present invention.

FIG. 5 is a flowchart illustrating an exemplary process for reducing downtime when patching multiple binaries on a cluster according to one embodiment of the present invention. In this example, the process can begin with identifying 505 resources on one or more of a plurality of nodes of the cluster. For example, the resources can comprise one or more instances of a database, one or more applications, one or more servers, and/or any other resources on the cluster. Identifying 505 resources on a node of the cluster can be based, for example, on reading registration and/or configuration information for the node and/or the cluster. Additionally, each of the plurality of binary modules on one or more of the plurality of the nodes of the cluster can be identified 510. Identifying 510 binary modules on a node of the cluster can also be based, for example, on reading registration and/or configuration information for the node and/or the cluster.

A graph can be generated 515 logically representing the cluster. For example, a graph such as described in detail above with reference to FIG. 4 can be generated 515 which logically represents the physical arrangement of the cluster. As noted above, the graph logically representing the cluster can represent each of the plurality of nodes, each of the resources, and each of the plurality of binary modules and relationships between the binary modules and the resources.

Groups within the binary modules and resources can be identified 520 based on the graph. That is, "connected" vertices of the graph within the portion representing the binary modules and the resources can be identified. These connected vertices can be logically grouped together into one or more groups of related nodes. An exemplary process for identifying 520 these groups will be described in greater detail below with reference to FIG. 6.

Patches can be applied 525 to the binary modules based on the identified groups. Patching binary modules based on the identified groups can comprise patching all of the binary modules of an identified group together. That is, patches can be applied to the binary modules of an identified group in parallel or at nearly the same time so as to reduce the downtime, i.e., increase the availability, of these binary modules and the resources which utilize them. Additionally or alternatively, various optimization schemes may be applied to determine an order, timing, etc. for applying patches to binary modules within a group in a manor to reduce downtime of the binaries and/or resources, improve efficiency of the process, etc.

Figure 6:
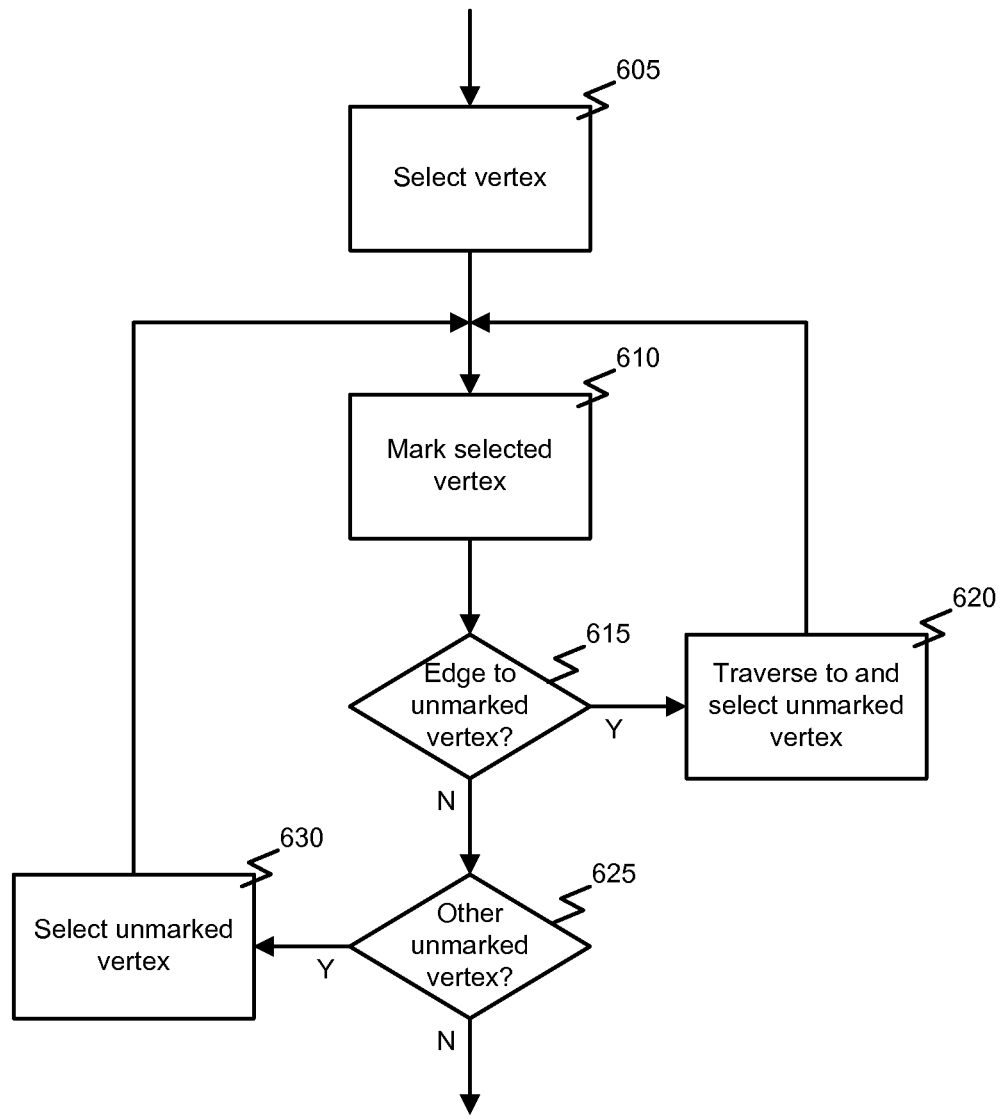
FIG. 6 is a flowchart illustrating an exemplary process for identifying groups of binaries and resources on a cluster according to one embodiment of the present invention.

FIG. 6 is a flowchart illustrating an exemplary process for identifying groups of binaries and resources on a cluster according to one embodiment of the present invention. This example illustrates a process for identifying groups of binary modules and resources based on a graph logically representing the cluster such as the graph described in detail above with reference to FIG. 4. More specifically, this example is based on a graph in which the cluster is represented as a root of the graph and each node of the cluster is represented as a first set of nodes of the graph that are child nodes of the root. Each binary module can be represented as a second set of nodes of the graph that are child nodes of the first set of nodes of the graph based on the nodes of the cluster on which the binary is executing. Each resource can be represented as a third set of nodes of the graph that are child nodes of the second set of nodes of the graph based on the binaries which the resources are executing.

In this example, identifying groups within the binaries and resources based on the graph can comprise selecting 605 a vertex from the second set of nodes of the graph, i.e., those representing the binary modules, or third set of nodes of the graph, i.e., those representing the resources. The selected vertex can be marked 610 as a member of the group. Marking 610 the vertex can comprise identifying the selected vertex as a member of the group in any of a number of different ways including but not limited setting a flag or assigning metadata other information a data structure representing the vertex and/or graph, adding an identifier or indication of the selected vertex to a list or other structure identifying the group, etc.

Once the selected vertex is marked 610, a determination 615 can be made as to whether the graph includes an edge from the currently selected vertex to another vertex that is yet unmarked, i.e., goes not yet belong to a group. If 615 an edge to an unmarked vertex in the second set of nodes of the graph or third set of nodes of the graph is identified, the unmarked vertex can be selected 620. Marking 610 the selected vertex as a member of the group, identifying 615 an edge to an unmarked vertex of the second set of nodes of the graph or third set of nodes of the graph, and selecting 620 the unmarked vertex can be repeated until no edge to an unmarked vertex is found, i.e., all of the vertices connected to the current group have been found.

Once it is determined 615 that there is no edge from the currently selected vertex to an unmarked vertex in the second set of nodes of the graph or third set of nodes of the graph, a determination 625 can be made as to whether other vertices, i.e., not connected to the currently selected vertex, exists in the graph. In response to determining 625 that another unmarked vertex exists in the graph, the unmarked vertex can be selected 630 and marking 610 the selected vertex as a member of the new group, identifying 615 an edge to an unmarked vertex of the second set of nodes of the graph or third set of nodes of the graph, and selecting 620 the unmarked vertex can be repeated until no edge to an unmarked vertex is found.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for applying a patch to a plurality of binary modules on a computing cluster, the method comprising:
    identifying, by a computing device, resources associated with one or more of a plurality of nodes of the cluster from registration information for one of the cluster and the plurality of nodes, wherein each of the resources utilizes one or more of the plurality of binary modules during execution on the associated one or more of the plurality of nodes;
    identifying, by the computing device from registration information for one of the cluster and the plurality of nodes, each of the plurality of binary modules executing on one or more of the plurality of the nodes of the cluster;
    generating, by the computing device, a hierarchical graph logically representing (i) the nodes of the cluster, (ii) the plurality of binary modules executing on each of the nodes, (iii) relationships indicating which node each of the binary modules is executing on, (iv) the resources used by each of the nodes, and (v) graph relationships indicating, for each of the resources, which of the binary modules that each resource is utilizing during execution;
    identifying, by a graph theory algorithm executed on the hierarchical graph by the computing device, a first group of binary modules that are executed during execution of one or more of the resources in a first group of resources and a second group of binary modules that are executed during execution of one or more of the resources in a second group of resources, wherein identification of each group comprises:
        selecting the graph relationship of the hierarchical graph generated by the computing device indicating which of the binary modules that each resource is utilizing during execution based on the relationships indicating which node each of the binary modules is executing on and the resources used by each of the nodes;
    applying a first set of patches, by the computing device, by updating code of each binary module of the first group of the binary modules in parallel, and wherein applying the first set of patches comprises:
        applying the first set of patches to the first group of the binary modules separate from the second group of binary modules being patched, while the first group of resources are shut down; and
    applying a second set of patches, by the computing device, by updating code of each binary module of the second group of the binary modules in parallel, wherein applying the second set of patches comprises:
        applying the second set of patches to the second group of the binary modules separate from the first group of binary modules being patched, while the second group of resources are shut down.

2. The method of claim 1, wherein generating the graph logically representing the cluster comprises:
    representing the cluster as a root of the graph;
    representing each node of the cluster as a first set of nodes of the graph, wherein the first set of nodes of the graph are child nodes of the root;
    representing each binary module as a second set of nodes of the graph, wherein the second set of nodes of the graph are child nodes of the first set of nodes of the graph based on the nodes of the cluster on which the represented binary module is executing; and
    representing each resource as a third set of nodes of the graph, wherein the third set of nodes of the graph are child nodes of the second set of nodes of the graph based on which binary modules the resources are utilizing.

3. The method of claim 2, wherein identifying groups within the binaries and resources based on the graph comprises:
    selecting a vertex from the second set of nodes of the graph or third set of nodes of the graph;
    marking the selected vertex as a member of the first group of binary modules or the first group of resources;
    identifying an edge to an unmarked vertex in the second set of nodes of the graph or third set of nodes of the graph;
    selecting the unmarked vertex; and
    repeating said marking the selected vertex as a member of the first group of binary modules or the first group of resources, identifying an edge to an unmarked vertex of the second set of nodes of the graph or third set of nodes of the graph, and selecting the unmarked vertex until no edge to an unmarked vertex is found.

4. The method of claim 2, wherein applying the first set of patches to the binary modules comprises applying patches to all of the binary modules of the identified first group of binary modules together.

5. The method of claim 1, wherein the resources comprise one or more instances of a database.

6. The method of claim 1, wherein the resources comprise one or more applications.

7. The method of claim 1, wherein the resources comprise one or more servers.

8. A system for applying a patch to a plurality of binary modules on a cluster comprising:
    a plurality of nodes, each comprising a computing device that executes at least one binary module, of the plurality of binary modules, that is stored at the computing device;
    a processor; and
    a memory communicatively coupled with and readable by the processor and having stored therein a set of instructions which are executed by the processor to cause the processor to perform operations of:

identifying resources utilizing binary modules stored at the plurality of nodes of the cluster during execution of the resource from registration information for one of the cluster and the plurality of nodes;
identifying each of the plurality of binary modules executed by one or more of the plurality of the nodes of the cluster from registration information for one of the cluster and the plurality of nodes;
generating a hierarchical graph logically representing (i) the nodes of the cluster, (ii) the plurality of binary modules executing on each of the nodes, (iii) relationships indicating which node each binary module is executing on, (iv) the resources used by each of the nodes, and (v) relationships indicating which of the binary modules that each resource is utilizing during execution;
identifying, in the hierarchical graph, via a graph theory algorithm stored on the memory, at least a first group of resources that utilize a first group of binary modules and a second group of resources that utilize a second group of binary modules, wherein identifying each group comprises:
  selecting the relationships of the hierarchical graph identified by the graph theory algorithm indicating which of the binary modules that each resource is utilizing during execution based on the relationships indicating which node each of the binary modules is executing on and the resources used by each of the nodes;
applying a first set of patches, by the computing device, by updating code of each binary module of the first group of the binary modules in parallel, and wherein applying the first set of patches comprises:
  applying the first set of patches to the first group of the binary modules separate from the second group of binary modules being patched, while the first group of resources are shut; and
applying a second set of patches, by the computing device, by updating code of each binary module of the second group of the binary modules in parallel, wherein applying the second set of patches comprises:
  applying the second set of patches to the second group of the binary modules separate from the first group of binary modules being patched, while the second group of resources are shut down.

9. The system of claim 8, wherein generating the graph logically representing the cluster comprises:
  representing the cluster as a root of the graph;
  representing each node of the cluster as a first set of nodes of the graph, wherein the first set of nodes of the graph are child nodes of the root;
  representing each binary module as a second set of nodes of the graph, wherein the second set of nodes of the graph are child nodes of the first set of nodes of the graph based on the nodes of the cluster by which the represented binary module is executed; and
  representing each resource as a third set of nodes of the graph, wherein the third set of nodes of the graph are child nodes of the second set of nodes of the graph based on which binary modules the resources are utilizing.

10. The system of claim 9, wherein identifying groups within the binaries and resources based on the graph comprises:
  selecting a vertex from the second set of nodes of the graph or third set of nodes of the graph;
  marking the selected vertex as a member of the first group of binary modules or the first group of resources;
  identifying an edge to an unmarked vertex in the second set of nodes of the graph or third set of nodes of the graph;
  selecting the unmarked vertex; and
  repeating said marking the selected vertex as a member of the first group of binary modules or the first group of resources, identifying an edge to an unmarked vertex of the second set of nodes of the graph or third set of nodes of the graph, and selecting the unmarked vertex until no edge to an unmarked vertex is found.

11. The system of claim 9, wherein applying patches to the first group of binary modules comprises applying patches to all of the binary modules of the identified first group of binary modules together.

12. The system of claim 8, wherein the resources comprise one or more instances of a database.

13. The system of claim 8, wherein the resources comprise one or more applications.

14. The system of claim 8, wherein the resources comprise one or more servers.

* * * * *